United States Patent [19]

Subramanian et al.

[11] Patent Number: 5,128,202
[45] Date of Patent: Jul. 7, 1992

[54] MELT FABRICATION OF FOAM ARTICLES

[75] Inventors: Pallatheri M. Subramanian; Christopher L. Tice, both of Hockessin, Del.

[73] Assignee: E. I. Du Pont de Nemours and Company, Wilmington, Del.

[21] Appl. No.: 685,385

[22] Filed: Apr. 12, 1991

[51] Int. Cl.⁵ .............................. B32B 3/26
[52] U.S. Cl. .................. 428/318.6; 264/45.5; 264/48; 264/53; 428/318.8; 521/51
[58] Field of Search .............. 264/45.5, 48, 53; 428/318.6, 318.8; 521/51

[56] References Cited

U.S. PATENT DOCUMENTS

| 3,317,363 | 5/1967 | Weber | 264/48 |
| 4,183,435 | 1/1980 | Thompson et al. | 428/317.1 |
| 4,870,110 | 9/1989 | Mehra et al. | 521/46.5 |
| 4,940,629 | 7/1990 | Weber et al. | 428/318.8 |
| 5,053,258 | 10/1991 | Booze et al. | 428/36.6 |

Primary Examiner—William J. Van Balen

[57] ABSTRACT

Foam molding is carried out with a melt blend of polyethylene terephthalate (PET), ethylene copolymer elastomer, and glass fibers in the presence of blowing agent and with a cold mold, so that the resultant foamed article has an amorphous-rich PET surface and a crystalline PET core.

9 Claims, 2 Drawing Sheets

MELT FABRICATION OF FOAM ARTICLES

FIELD OF THE INVENTION

This invention relates to the melt application of polyethylene terephthalate foam articles such as pallets exhibiting both high stiffness and high toughness.

BACKGROUND OF THE INVENTION

Structural foam as a plastic product has an integral skin and cellular core. The combination of the skin, which is normally solid, i.e., without voids or cells, and the cellular core produces a relatively high strength to weight ratio manifested as high stiffness. Unfortunately, because of the presence of the cellular core, the increase in stiffness of the structural foam is accompanied by a decrease in toughness. When the structural foam is in the form of a pallet, it typically has sufficient rigidity for holding and transporting a load, but the pallet tends to crack and break upon the rough handling typical of pallet usage.

U.S. Pat. No. 3,268,636 discloses the basic process for making structural foam articles by melting thermoplastic resin and forcing it into a mold in the presence of a blowing agent to mold the article. Upon entry of the molten resin into the mold, the blowing agent foams the resin to create the cellular core of the molded article. The mold is kept at a temperature below the melting temperature of the resin so that the resultant rapid solidification of the resin coming into contact with the surface of the mold keeps this resin relatively solid, i.e., non-cellular, to form the skin of the molded article. The resin which does not come into contact with the mold surface remains sufficiently fluid in the mold to permit its foaming by the blowing agent. Example 1 of U.S. Pat. No. 3,268,636 discloses a mold temperature of 320° F. (160° C.) when high density polyethylene was used as the resin to produce a bowling pin having a dense outer shell having a polished-like surface and a cellular core. Example 2 discloses the resin to be a 50:50 blend of polyethylene with polypropylene and a mold temperature of 70° F. (21° C.) to produce a structural foam bowling pin having a less desirable grainy texture similar to wood.

The resins used in this patent were semicrystalline resins which have melt characteristics (high melt viscosity and high melt strength) which make them easy to foam with the use of the blowing agent. Indeed, the most popular structural foam pallet of thermoplastic resin used today is that wherein the resin is high density polyethylene.

Polyester resins are thermoplastic resins that typically can be crystallized from the molten state. These resins, however, have found relatively small usage in the structural foam application. Polybutylene terephthalate (PBT) available as Valox ® resins with 10% to 30% glass reinforcement is supplied by the General Electric Company for structural foam application. This is a relatively expensive polyester resin and is well known to crystallize rapidly upon cooling down from the molten state. The publication "Structural Foam" published by the Society of the Plastics Industry (believed published in the 1970's) discloses on page 6 the Charpy impact (un-notched) and test result of only a 5.3 ft. lbs/in (283 J/m) for structural foam articles made from "Thermoplastic Polyester" which is believed to be PBT.

The less expensive polyethylene terephthalate (PET) has not found utility in structural foam articles, such as pallets. PET differs from PBT by crystallizing less rapidly from the molten state, enabling even the amorphous state to be achieved if the cooling is rapid enough to a temperature below the glass transition temperature (Tg) of the PET which is about 75° C. When an article of PET is exposed to temperatures above 75° C., however, it tends to lose its toughness properties, because above this temperature, the PET crystallizes. This crystallization occurring upon reheating is rather coarse-grained crystallization, which has led the PET art to use crystallization promoters to induce fine-grain crystallization state to give better toughness properties. These crystallization promoters promote the formation of fine grain crystallization at the expense of amorphous PET. The unique attributes of PET, as well as the attributes of low melt viscosity and low melt strength, of this popular and widely used resin have led to the utility of PET in fields other than foam.

SUMMARY OF THE PRESENT INVENTION

The present invention provides articles of foam made of more economically available polyester resin and which provides both high strength and high stiffness and in addition, high resistance to creep at elevated temperatures, so as to make the present invention especially useful for the production of structural foamed articles, i.e., articles to be exposed to load. This economically available resin is polyethylene terephthalate (PET), and the source of this resin can be post consumer waste such as from the recycling of PET soda bottles which can reduce the cost of availability of this resin. Thus the present invention provides a way to use recycle PEI in high value applications.

In one embodiment, the present invention can be described in the context of the conventional foam melt fabrication process, but with selection of the foam composition and the fabrication conditions to produce a unique combination of crystallinity characteristics in the foamed article. Thus, this embodiment operates in the process of melt fabricating a foam article having a solid skin and a cellular core by melting thermoplastic resin and fabricating it in the presence of blowing agent into said article, the improvement comprising forming the melt of thermoplastic resin from a blend of about 50 to 90 weight percent of polyethylene terephthalate, about 5 to 25 weight percent of ethylene copolymer elastomer, and about 1 to 25 weight percent of glass fibers, to total 100% of the combined weight of these components, and chilling the surface of the melt during said fabricating to a temperature below the glass transition temperature of said polyethylene terephthalate so that the surface of the resultant fabricated foam article is amorphous-rich, with the resultant cellular core of said article being sufficiently insulated from said chilling to have a higher crystallinity than said surface, with the proviso that said melt blend including said blowing agent is sufficiently free of crystallization promoter to permit said surface to be chilled to the amorphous-rich state.

Polyethylene terephthalate (PET) can be chilled from the molten condition to the amorphous state. Slower cooling from the molten condition results in the PET solidifying in the crystalline state. The present invention advantageously involves the creation of both states in the foam article. The chilling of the melt blend to bring about the amorphous-rich surface involves extreme cooling of the mold to a temperature below about 75° C., the glass transition temperature of the PET, when considering that the melt temperature of the resin blend entering the mold is above about 250° C. Crystallization promoters, often called nucleation agents, normally present in PET compositions used for injection molding of thick walled articles, e.g., having a wall thickness of at least about 0.125 in. (3.175 mm), need to be absent from the resin blend at least to the extent to permit the surface to become amorphous-rich, otherwise the surface will crystallize along with the cellular core of the foam article. It is important for the surface of the foam article of this invention to contain amorphous PET because this significantly boosts the toughness of the article as compared to when the surface is entirely crystalline PET.

Another embodiment of the present invention resides in the composition and crystallinity characteristics of the foamed article, it being a blend of about 50 to 90 weight percent polyethylene terephthalate, about 5 to 25 weight percent of ethylene copolymer elastomer finely dispersed in said blend and about 1 to 25 weight percent of glass fiber, to total 100%, said article having a skin and a cellular core, the polyethylene terephthalate present at the surface of said skin being amorphous-rich and the polyethylene terephthalate present in the cellular core of said article being more crystalline than said surface.

DETAILED DESCRIPTION OF THE INVENTION

The thermoplastic resin blend used in the process of the present invention has four essential components: PET, ethylene copolymer elastomer, glass fibers, and blowing agent, and the requirement that the blend be sufficiently free of crystallization nucleation agent so that the surface of a foam article melt fabricated from the blend can be cooled to a low enough temperature sufficiently rapidly that the surface is amorphous-rich.

Figure 1:
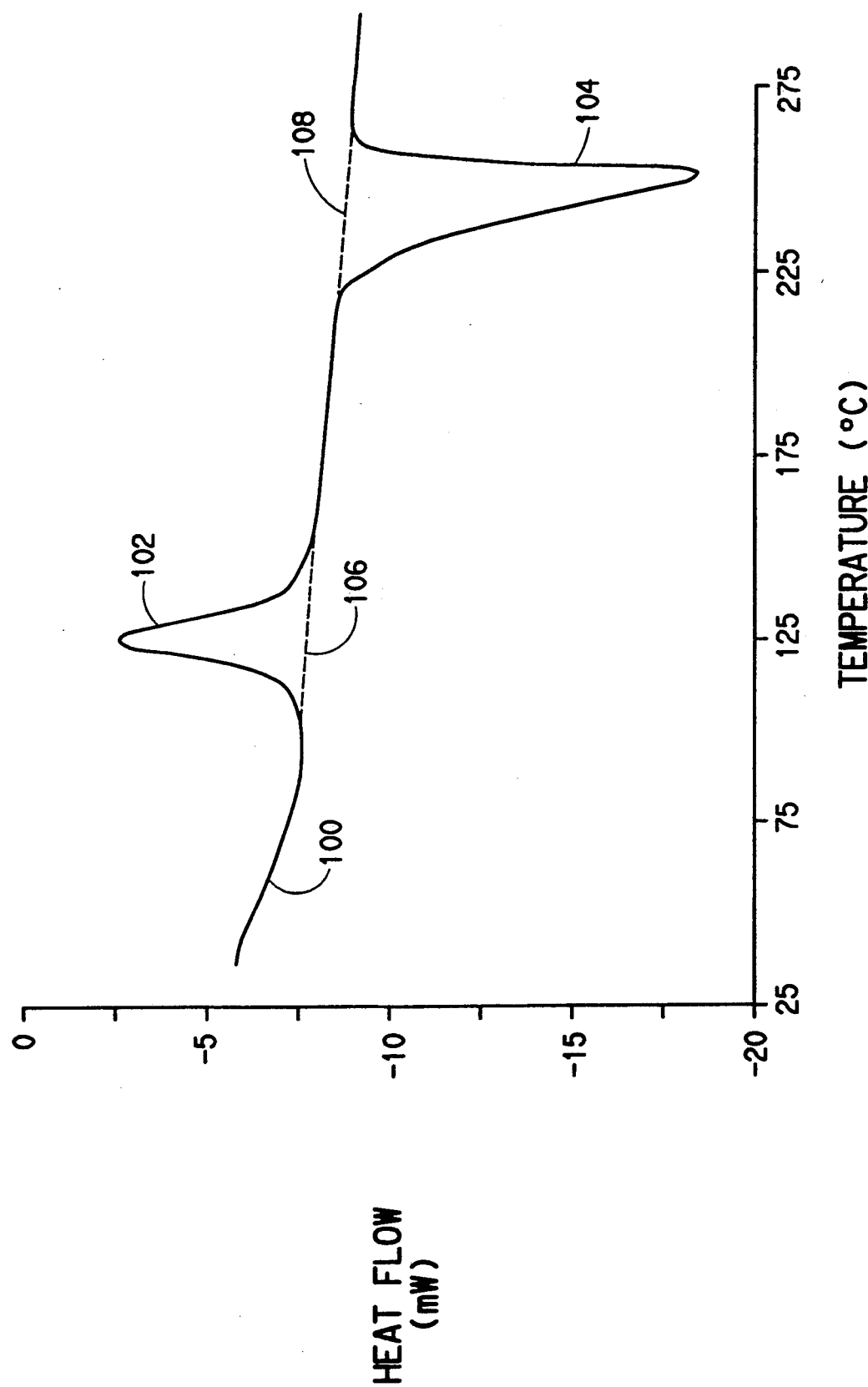
FIG. 1 is a graph of heat flow changes of a sample taken from the surface of a foam article of the present invention and subjected to differential scanning calorimetry (DSC).

The crystalline or amorphous states as described herein present in the foam article of the present invention are measured by differential scanning calorimetry (DSC) in accordance with the procedure of ASTM D794-81 using a heating rate of 10° C./min. for samples taken from the foam article. The sample size is about 10 mg. and about 0.005 in. (0.13 mm) thick, taken from the area of the article to be subjected to analysis. The samples can simply be cut from the article. Some variation in sample thickness from the surface of the article is relatively unimportant, because the amorphous content does not change (reduce) so sharply with small increases of distance from the surface towards the cellular core. In accordance with DSC, a graph is plotted of heat flow changes occurring within the sample. FIG. 1 is a DSC graph of a sample taken from the amorphous-rich surface of the article. Heat flow in the graph represents the enthalpy change (heat evolved or absorbed) due to physical changes in the sample when heated at the rate of 10° C./min. Curve 100 shown in FIG. 1 is the resultant graph. At about 127° C., an exotherm peak 102 is generated by the amorphous PET converting to crystalline PEI. At about 252° C. an endotherm peak (valley) is generated by the crystalline PET (entire sample) melting. Each peak 102 and 104 has its respective baseline 106 and 108. The area of peak 104 (in Joules/g (J/g) of sample) represents the total available crystallinity within the sample, which for the purpose of this test is taken to mean 100% crystallinity. Comparison of the area of peak 102 with that of peak 104 gives the relative percent amorphous content of the surface. In FIG. 1, the calculation would be 9.9 J/g divided by 27.1 J/g, representing the areas of peaks 102 and 104, respectively, to give a relative surface amorphous content of 36.5%. The relative % crystalline PET content of the surface would be 100 minus 36.5=63.5%.

The expression "amorphous-rich" is used herein to denote the higher amorphous content of the surface than the interior or core of the foam article. Normally, the amorphous content of the core of the article will be about zero, as determined by DSC except that for relatively thin-wall foam articles, some chilling of the core may also occur along with the chilling of the surface. Nevertheless, the chilling at the surface will provide more rapid cooling of the PET below its Tg so as to inevitably provide a greater amorphous content than the core. A DSC curve plotted for a sample of 100% crystalline core will not show any exotherm peak, corresponding to peak 102 in FIG. 1, because all the PET is already in the crystalline state. The same is true for a DSC curve for an annealed surface of formerly amorphous-rich PET, because the annealing would convert the amorphous PET to crystalline PET.

The expression "amorphous-rich" is also used to distinguish from absolute measurements cf crystallinity. In an absolute sense, PET has a theoretical maximum of 60% crystallinity and in practice, no more than about 30 to 40% crystallinity is reached as measured by x-ray procedure. The DSC measurement, however, considers the endotherm peak 104 to be 100% crystallinity. Thus the amorphous PET content determined by DSC is a relative amorphous content, i.e., relative to the 100% crystallinity assumed for the melting endotherm. The relative amorphous content of the surface is preferably at least 20% greater than the relative amorphous content, if any, of the core (center of the core). The relative amorphous content present at the surface of the foam article of the present invention can in fact be as little as about 20% and improved toughness results will still be obtained.

The polyethylene terephthalate component includes the linear saturated condensation product of ethylene glycol and terephthalic acid, which can be considered a homopolymer, but also such product wherein minor proportions of these difunctional reactants are replaced by other difunctional reactants, e.g. up to about 5 weight percent of isophthalic acid in place of the corresponding amount of terephthalic acid, wherein the resultant polymer can be considered a copolymer. Preferably for reasons of economy, the PET component is composed cf post-consumer PET recovered from the grinding up of PET containers such as carbonated beverage bottles, and separation of the polypropylene, and high density polyethylene resins usually associated therewith. This post consumer PET is available as flakes and despite the inevitable presence of impurities is still useful in the present invention. The inherent viscosity of the polyethylene terephthalate should be at least about 0.55 as measured by the procedure disclosed in U.S. Pat. No. 4,753,980.

The ethylene copolymer elastomer component is a copolymer of ethylene with one or more copolymerizable other ethylenically unsaturated monomers which produce an elastomer. An elastomer in accordance with the present invention is a thermoplastic resin which at room temperature exhibits substantial deformability, e.g., stretchability, and substantially immediate complete recovery of original dimension upon release of the force causing the deformation. This resin also typically exhibits a glass transition temperature (Tg) below ambient temperature (20° C.). Examples of elastomers include ethylene copolymers wherein ethylene is copolymerized with one or more of such monomers such as vinyl acetate, alkyl (meth)acrylate, such as methyl, ethyl, or butyl(meth)acrylates, (meth)acrylic acid, (meth)acrylamide, carbon monoxide, or glycidyl (meth)acrylate. More specific examples of such ethylene copolymer includes ethylene/n-butyl acrylate/carbon monoxide, ethylene/n-butyl acrylate/glycidyl methacrylate, and ethylene/vinyl acetate/carbon monoxide. The ethylene/vinyl acetate and ethylene/(meth)acrylate copolymer may include grafted acid, anhydride or glycidyl groups. Additional ethylene copolymers include ionomers and ethylene/propylene and ethylene/propylene/diene elastomers with or without grafted acid or anhydride groups. The ethylene copolymer elastomer provides some toughness to the PET, but this is insufficient to make up for the loss of toughness arising from the cellular core of the foam article and to provide for the high level of toughness needed for structural foam articles. The combination of the amorphous-rich surface and crystalline core of the PET foam article is required to reach this high level of toughness.

The glass fiber provides stiffness to the structural foam article, without appreciable loss of toughness. Such fiber can be in the form of single and multifilament shaped structures, such as threads, strands, rovings, yarns, wherein the individual filaments can be twisted together or otherwise adhered together to maintain the integrity of the shaped structure. Individual fibers typically have a thickness of about 5 to 20 micrometers. Often these fibers are coated with sizing to promote adhesion between the fibers and/or the PET/elastomer matrix, and the present invention contemplates the use of coated glass fibers. Examples of sizing include the organotitanates and silanes. Representative organotitanates include, tetraisopropyl, di(dioctylphosphito) titanate; titanium dimethacrylate oxyacetate; isopropyl diisostearyl, methacryl titanate; isopropyl tricumylphenyl titanate; and isopropyl tri(dioctylpyrophosphato) titanate. Representative silanes include, 3-aminopropyltriethoxysilane, vinyl triethoxysilane, and 3-chloropropyltrimethoxysilane.

The PET and elastomer components are incompatible in the sense that the elastomer component is present as finely dispersed particles in the matrix of PET in the melt blend. This fine dispersion can be achieved by pre-compounding the PET and copolymer elastomer in a twin-screw extruder and feeding molding granules of this pre-blend to the injection molding machine along with the glass fibers. Alternatively, all of the components can be dry blended for the first time as a feed to the injection molding machine for direct fabrication into the molded article. The mixing screw of the injection molding machine can be equipped with a dispersion head, such as a Maddock head, to aid in the dispersion of the elastomer within the PET in the melt blend, but the shear applied by the dispersion head will be somewhat at the expense of the stiffness provided by the glass fibers, i.e., the shear applied by the dispersion head will break up the glass fibers into shorter lengths which reduces their stiffening effect. This can be avoided by precompounding the PET and elastomer or by direct fabrication but without the use of the dispersion head in the injection molding machine.

The preferred blend compositions used in the process of the present invention include about 60 to 80 weight percent PET, about 5 to 20 weight percent ethylene copolymer elastomer, and about 5 to 20 weight percent glass fiber and more preferably about 65 to 75 weight percent PET, 8 to 18 weight percent ethylene copolymer, about 10 to 18 weight percent glass fibers. These weight percents are based on the total of these components being 100%.

The melt blend of the composition also contains blowing agent to cause expansion of the melt blend when the pressure of the melt fabrication apparatus is relieved, such as when the melt blend enters the mold of an injection molding machine. The blowing agent can be a chemical blowing agent such as azodicarbonamide, or nitrosocompound such as dinitrosopentamethylene tetramide hydrazine, which while nucleating the melt blend for blowing (gas cell) sites does not cause appreciable nucleation of the crystallization of the PET component which would prevent the formation of the amorphous-rich surface of the foam article of the present invention. The blowing agent can also be an inert gas such as $N_2$ or volatile liquid such as pentane injected into the melt blend within the melt fabrication machine. The amount of blowing agent will generally be about 0.1 to 2.0 weight percent based on the weight of the remaining components of the melt blend.

Figure 2:
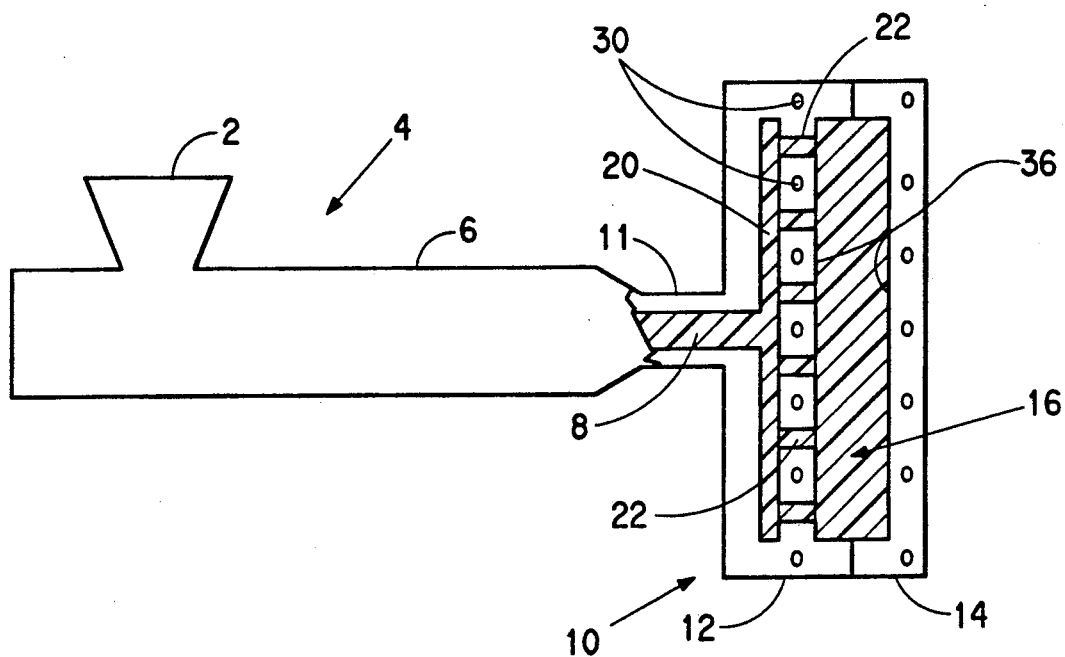
FIG. 2 is a schematic side elevation, partially cutaway, of foam injection molding apparatus for carrying out the process of the present invention.

In accordance with the one embodiment of melt fabrication process of the present invention and with reference to FIG. 2, these components are fed as a blend to a hopper 2 leading to a conventional mixing screw (not shown) of an injection molding machine 4. The blend is melted within the screw barrel 6 to become a melt blend 8. Blowing agent is provided to this blend either as part of the feed or by injection into the barrel, depending on which blowing agent is used.

The barrel 6 communicates with a mold 10 via a pipe 11. The mold shown in the embodiment of FIG. 2 consists of an upstream half 12 and a downstream half 14 which are clamped together by conventional means not shown. Together, these mold halves define a cavity which forms the shape of the structural foam article 16 shown.

Mold half 12 contains branch channels 20 and a plurality of passages 22 (sprues) which communicate between pipe 11 and the mold cavity. The purpose of the channels and passages is to substantially uniformly distribute the melt blend 8 supplied through pipe 11 to the mold cavity.

In operation the mixing screw of the injection molding machine forces the melt blend 8 through the pipe 11, channels 20 and passages 22 into the mold cavity to form article 16. As the melt blend enters the mold cavity, the blowing agent causes the melt blend to expand, creating the cellular core of the article 16.

Figure 3:
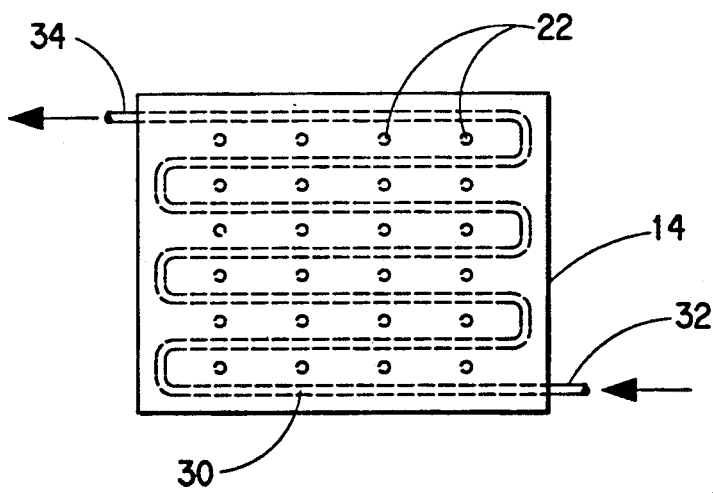
FIG. 3 is a schematic side elevation of one embodiment of mold used for carrying out the process of the present invention.

In accordance with the present invention the mold halves 12 and 14 are cooled by coolant circulating through these mold halves via internal cooling passages 30. As shown in FIG. 3, the internal passage 30 in mold half 14 can be in the form of a sinusoidal or serpentine passage which traverses the whole span of the mold. Coolant of such liquids as chilled water, brine, or ethylene glycol solution, can be fed to the passage 30 via inlet pipe 32 and after flowing "across" the span of the mold half, can exit via outlet pipe 34. The mold half 12 can have the same configuration of its internal cooling passage 30. Other configurations can be used to cool their respective mold halves. The temperatures of the coolant in the inlet pipe 32 and the temperature of the coolant in the outlet pipe 34 are measured, the higher temperature in the outlet pipe representing the heating up of the mold by the entering melt blend. Preferably the mold hold time to form the article and cool it within the mold is controlled so that the coolant temperature in outlet pipe 34 is within 10° C. of the temperature of the coolant in inlet pipe 32.

The distribution of passages 22 across the span of the mold half is also shown in FIG. 3. Other distributions can be used to accomplish filling of the entire mold with the melt blend, and injection molding apparatus other than shown in FIGS. 2 and 3 can be used to conduct the process of the present invention.

As previously described herein, the surface of the mold, represented as 36 in FIG. 2, coming into contact with the surface of the melt blend is chilled sufficiently so as to rapidly cool the melt blend surface coming into contact with the mold surface to a temperature below the glass transition temperature of about 75° C. to solidify in the amorphous-rich state. This rapid solidification also essentially prevents the blowing agent from forming cells in the resultant skin of the foam article and the surface of this skin.

Figure 4:
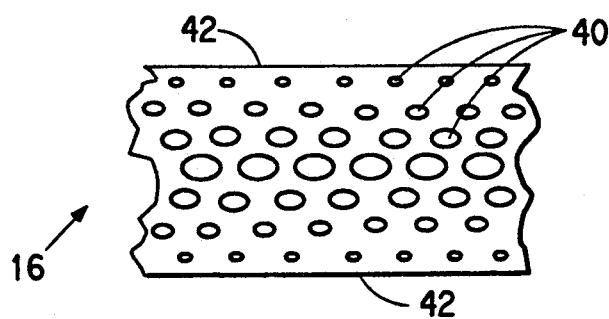
FIG. 4 is a schematic side elevation of a portion of foam article molded by the process of the present invention.

FIG. 4 shows schematically the distribution of cells 40 within the interior of the molded article 16, i.e., forming the cellular core, with the size of the cells generally diminishing the closer they approach the integral skin of the article. The thickness of the skin will depend on the extent of chilling the mold surface provides to the melt blend contacting it. The same is true for the depth of the amorphous-rich surface 42 of the skin. Preferably, the temperature of coolant leaving the mold, e.g. via outlet pipe 34, is no greater than about 40° C. to sufficiently cool the mold to form an amorphous-rich PET surface, containing at least 30% relative amorphous content of PET as measured by DSC, to provide high toughness to the article 16. Preferably the coolant leaving the mold is at a temperature of 20° C. or less. For simplicity, these temperatures of the coolant leaving the mold can be considered to be the mold temperature.

The amorphous-rich surface gradually increases in crystallinity with increasing depth from the surface of the foam article.

The resultant foam article possesses both high stiffness and high toughness and also good high temperature dimensional stability, i.e., creep resistance, making the process of the present invention especially useful for making structural foam articles, i.e., articles intended to withstand load and rough handling. These structural foam articles typically will have a wall thickness of at least about 0.125 in. (3.175 mm) and more often, at least about 0.25 in. (6.4 mm) High temperature dimensional stability can be measured by creep resistance under load at 65° C. (150° F.). Although this temperature is less than the melting point of high density polyethylene, structural foam pallets made from this resin will deform under load at elevated temperatures sometimes reached during transport and storage in hot climates. The resultant warped pallets thereafter have limited utility. The pallets made in accordance with the present invention are much more dimensionally stable under equivalent conditions.

These results are unique in the structural foam art in the sense of being achievable with economically available polyethylene terephthalate. This application of PET in structural foam is also unique as will become apparent by reference to prior disclosures on the molding of polyethylene terephthalate. British patent 1,158,348 discloses the injection molding of massive articles, as compared to films and fibers, of polyethylene terephthalate with the use of a cold mold, which cools the surface of the articles to the amorphous state, and with the interior of the articles cooling less rapidly, to give the crystalline state. This result is disclosed to be disadvantageous because the molded articles are non-uniform and the crystallinity in the interior is coarse, leading to brittleness. The contribution of this patent is to use a heated mold and to incorporate finely divided pyrophyllite as a crystallization nucleation agent into the PET, with the result being entirely crystalline PET articles with a finer crystal structure and improved homogeneity. The molded articles are disclosed to possibly also contain chopped glass fibers.

U.S. Pat. No. 4,753,980 discloses the toughening of polyester resin with ethylene copolymer including elastomers as the dispersed phase in the polyester resin matrix. The patent also discloses the possibility for incorporating crystallization promoters and glass fibers in the resin blend. This teaching is demonstrated with both polyethylene terephthalate and polybutylene terephthalate as the polyester, and the test moldings are annealed at 150° C. overnight in order to create a constant (maximum) level of crystallinity.

EPO patent publication 0,211,649 discloses the melt fabrication of PET toughened with ethylene copolymer blends into articles which are used in applications wherein barrier properties are required, e.g., as containers, closures, films, sheets, liners, and pond covers, all of which are characterized by relatively thin cross-section. Specific thicknesses of 1.25 mm and 0.025-0.05 mm are disclosed. In accordance with this publication, the melt-fabrication uses shaping equipment under conditions minimizing crystallization, by avoiding the use of nucleation agent and by using cold shaping equipment. The PET in the resultant articles is amorphous and the articles are described as having good barrier properties and being tough. Fillers are not desired because that detracts from the barrier properties, but if they are present, no more than up to about 10% of the polymer weight of the filler should be used and the filler should be finely ground. U.S. Pat. No. 3,803,275 discloses the blow molding of PET into a chilled mold and the rapid removal of the resultant blown container from the mold so as to avoid crystallization of the interior surface of the container.

These publications also illustrate the complexity of PET. When used to mold massive articles, entire crystallinity is desired (British patent 1,158,348). When toughened with ethylene copolymer, annealing is used to obtain homogeneous PET crystallinity (U.S. Pat. No. 4,753,980). When the toughened PET article is to be used for barrier purposes, the thin-walled article should be melt fabricated such that the PET in the article is amorphous and only a small amount of ground filler can be present in the article.

The present invention proceeds to find high value in the combination of amorphous and crystalline PET in a particular type of molded article, viz. foam, and a particular additive system, viz. glass fibers and ethylene copolymer elastomer, made in a way which produces advantage from the combination of amorphous and crystalline states for the PET in the article.

The present invention is especially useful for molding foam articles such as sheeting and large articles of structural foam, including such support structures as pallets, dunnage and support panel. Whereas pallets are multi-purpose support structures designed to support different loads of different shapes, dunnage is support structure designed to support a specific shape, e.g. a cradle for an automobile motor. These structural foams are both tough and stiff and have high resistance to creep at the elevated temperatures to which they may be exposed.

The process of the present invention is also useful in other melt fabrication processes, such as extrusion, wherein the melt blend can be extruded along a laterally confined path which forms the lateral dimensions of the foam article and wherein expansion of the blowing agent occurs to create the cellular core of the article and wherein cooling of the confinement forming the path chills its surface to in-turn chill the contacting surface of the melt blend to provide the amorphous-rich surface as hereinbefore described. The extrusion can be carried out onto a chilled support surface to cool the lower surface of the foam article, while the upper surface can be chilled by exposure to coolant such as air, which may itself be chilled.

The following Examples, in which parts and percents are by weight unless otherwise indicated, are provided as illustrations of the present invention.

EXAMPLE 1

A blend of 85% of PET (inherent viscosity of about 0.68) and 15% ethylene/n-butyl acrylate/glycidyl methacrylate copolymer (76.75:28:5.25) was prepared as pellets by melt compounding. These pellets were dry blended with a pre-blend of polyethylene terephthalate of similar inherent viscosity with glass fibers. The proportions of this blend was 75% of the pellets and 5% of the PET/glass fiber pre-blend, with the glass fibers in the pre-blend amounting to 13.8% of the total blend.

This blend was fed to an injection molding machine which molded a support panel in the shape of a large flat part with ribs and holes, approximately 152×50 cm in area and overall thicknesses up to 5 cm, weighing about 12.5 kg, with the flat part and ribs having thickness of about 6.4 mm. The molding temperature was about 250° C. and the temperature of the mold was about 15° C. by using chilled water circulating through the mold wall (mold temperature measured as the temperature of the water leaving the mold). Nitrogen was injected into the melt blend and served as the blowing agent.

The resultant structural foam article was very stiff, exhibiting a flex modulus of 3100 MPa (450,000 psi.). The article was also extremely tough. It could not be broken by the falling dart test, so repeated hammering with a 2¼ kg sledge hammer was undertaken on the surface of the article, and eventually a small piece broke off which showed excellent foam structure (fairly uniform cell structure and fairly thick skin).

The Gardner impact strength measured for samples taken from different locations on the article ranged from 272 to 336 in.-lb., av. 320 in.-lb. (314 to 387 kg-cm, av. 369 kg-cm) as compared to 216 to 272 in.-lb., av. 246 in.-lb. (249 to 314 kg-cm, av. 284 kg-cm) for similar samples annealed at 120° C. Samples cut from the top and bottom surfaces of the foam article exhibited 34.3% and 21.0% relative amorphous content, respectively, and the core was 100% crystalline, as determined by DSC.

The foam panel prepared in accordance with this Example exhibited a higher toughness than foam panels made from a wide variety of commercially available polymer compositions, including PBT/polycarbonate blend, polypropylene, polyethylene, and ABS resin. The panel prepared in accordance with the present invention also exhibited the highest foamability, i.e., difference between density of foam panel as compared to the density of the melt blend. In other words, the melt blend was very amenable to foaming. The panel of the present invention also made the stiffest article except for the panels of commercial polypropylene compositions (containing either 30% glass fiber or 40% CaCO$_3$) which were stiffer for short period loadings but which had greater creep upon extended period loading, especially at elevated temperature. A foam panel prepared as described in the first two paragraphs of this Example except having a glass fiber content of 1% exhibited the highest toughness, but this was at some sacrifice in stiffness and foamability.

EXAMPLE 2

A foam pallet was prepared essentially from the same composition and same molding procedure as used in Example 1 (first two paragraphs). This pallet was tested for creep at elevated temperature by supporting the pallet at two opposing sides so that the pallet center was off the ground and then loading the pallet with material weighing about 500 kg. and maintaining it at room temperature (21° C.) for an extended period of time. The sag of the pallet was measured after 24 hours and it was 4.5 mm (0.177 in.). This was the same sag (deflection from a straight line) that occurred when the load was initially applied to the pallet. After about four days under the same load and at the same temperature, the sag was the same, indicating a creep rate of zero in./hr.

Under these same testing conditions, a pallet made by the procedure of this Example and of the same composition except containing a smaller amount of the pre-blend such that the article contained only 1% glass fiber, gave a sag after 24 hrs. of loading of 24 mm (0.940 in.) and a creep rate of only 0.023 mm/hr. (0.0009 in./hr.) thereafter over a four day period. This test result was encumbered by the fact that the molding of the pallet was incomplete in that one of the edges of the pallet in the direction spanning the side supports in the creep test was not complete, i.e. the melt blend did not fill the edge portion of the mold.

In contrast, a high density foam polyethylene pallet molded in the same mold and tested for creep under the same condition gave a sag of 36.4 mm (1.43 in.) after 24 hrs. and a creep rate thereafter of 0.13 mm/hr. (0.0052 in./hr.) over a four day period.

When maintained at 88° C. (190° F.) the pallet of this Example (13.8% glass fiber) exhibited a sag of 20.9 mm (0.822 in.) after 24 hours and a creep rate thereafter over four days of only 0.013 mm/hr. (0.0005 in./hr.).

A polypropylene pallet was molded in the same mold as used in this Example and tested for creep at 88° C. under the same condition. This pallet exhibited a sag after 24 hours of 48.8 mm (1.92 in.) and a creep rate thereafter of 0.28 mm/hr. (0.011 in./hr.) over a period of four days. The high initial deflection and continuing creep of this pallet, which has higher temperature dimensional stability than pallets of high density polyethylene, indicates that these pallets would be virtually useless for load duty under this condition, while pallets of the present invention performed admirably well. In addition, the polypropylene and high density polyethylene pallets broke when exposed to a simple blow of a sledge hammer. In contrast, the pallet of the present invention exhibited a crack after being struck with three sledge hammer blows. Prolonged exposure of foam articles of the present invention can cause the amorphous-rich PET to become crystalline, the tendency for this to occur depending on how far above the Tg the heating is carried out and the duration. Exposure to temperatures just above the Tg results in a very slow conversion of amorphous PET to the crystalline form. By way of example, annealing which is done to convert all the amorphous PET to the crystalline state is typically carried out by heating at 120° C. for about 18 hours.

Both the polypropylene and high density polyethylene pallets tested as described above were prepared from commercially available polymer blends. These blends did not contain any glass fiber reinforcement because previous molding experience showed this to give pallets excessive brittleness.

EXAMPLE 3

The same composition as in Example 1 was prepared except that the PET/glass fiber pre-blend amounted to 20% of the total blend, to provide a glass fiber content of 11% for the total blend. The structural foam article of Example 2 was molded under similar conditions. Samples of the resultant article exhibited a Gardner impact strength of 104 in.-lb. (120 kg-cm) (failing at 112 in.-lb. (129 kg-cm)), while the annealed sample passed at 84 in.-lb. (97 kg-cm) and failed at 96 in.-lb. (111 kg-cm). The top and bottom surfaces of a sample from each surface had relative amorphous contents of 36.5% and 24%, respectively, and the core was 100% crystalline, all determined by DSC.

The PET/glass fiber pre-blend used in the foregoing Examples contained a small percent of crystallization nucleating agent which is effective to rapidly crystallize the pre-blend if used by itself, but in dilution in the overall blend, the amorphous-rich surface was still able to form upon contacting the cold mold cavity surface.

As many widely different embodiments of this invention may be made without departing from the scope and spirit thereof, it is to be understood that this invention is not limited to the specific embodiments thereof except as defined in the appended claims.

We claim:

1. In the process of melt fabricating an article having a solid skin and a cellular core by melting thermoplastic resin and fabricating it in the presence of blowing agent into said article, the improvement comprising forming the melt of thermoplastic resin from a blend of about 50 to 90 weight percent of polyethylene terephthalate, about 5 to 25 weight percent of ethylene copolymer elastomer, and about 1 to 25 weight percent of glass fibers, to total 100% of the combined weight of these components, and chilling the surface of the melt blend during said fabricating to a temperature below the glass transition temperature of said polyethylene terephthalate so that surface of the resultant fabricated foam article is amorphous-rich, with the resultant cellular core of said article being sufficiently insulated from said chilling to have a higher crystallinity than said surface, with the proviso that said melt blend including said blowing agent is sufficiently free of crystalline promoter to permit said surface to be amorphous-rich.

2. In the process of claim 1 wherein said fabricating is carried out in a mold and the chilling of the surface of the melt blend is done by chilling of the mold surface.

3. In the process of claim 2 wherein a coolant circulating through said mold is used to chill the mold to a temperature of no greater than about 40° C.

4. In the process of claim 1 wherein the article being melt fabricated is structural foam selected from the group consisting of pallet, panel and dunnage.

5. Pallet made by the process of claim 1.

6. A foam article of a blend of about 50 to 90 weight percent polyethylene terephthalate, about 5 to 25 weight percent of ethylene copolymer elastomer, and about 1 to 25 weight percent of glass fiber, said article having a skin and a cellular core, the polyethylene terephthalate present at the surface of said skin being amorphous-rich and the polyethylene terephthalate present in the cellular core of said article being crystalline.

7. The foam article of claim 6 as a pallet.

8. The foam article of claim 6 wherein the PET at said surface has a relative amorphous content of at least 20% as determined by differential scanning calorimetry.

9. The foam article of claim 6 wherein said polyethylene terephthalate is derived from post consumer waste.

* * * * *